W. A. FRASER.
TAP.
APPLICATION FILED MAR. 26, 1912.
1,097,416.
Patented May 19, 1914.
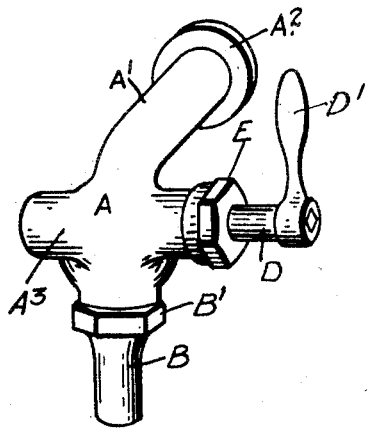
FIG. 1.
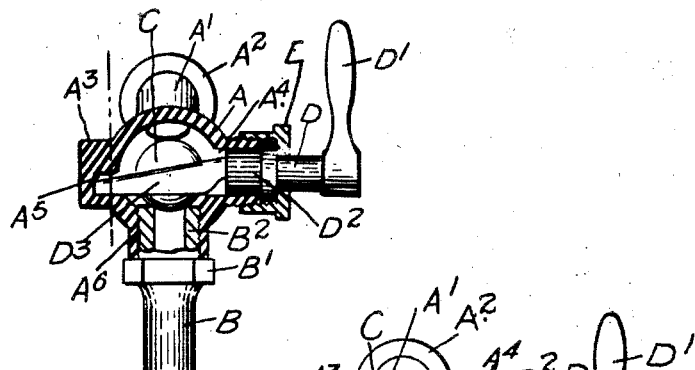
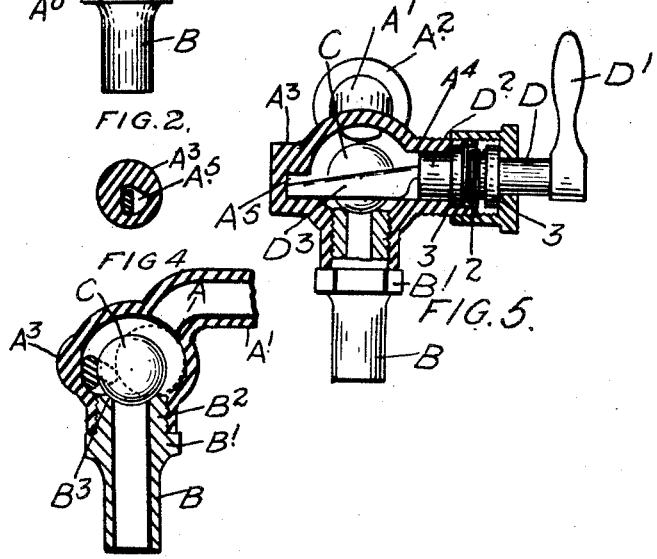
WITNESSES
INVENTOR
W. A. FRASER.

UNITED STATES PATENT OFFICE.

WILLIAM ALEXANDER FRASER, OF GEORGETOWN, ONTARIO, CANADA.

TAP.

1,097,416.  Specification of Letters Patent.  Patented May 19, 1914.

Application filed March 26, 1912. Serial No. 686,323.

*To all whom it may concern:*

Be it known that I, WILLIAM ALEXANDER FRASER, of the town of Georgetown, in the county of Halton, in the Province of Ontario, Canada, have invented certain new and useful Improvements in Taps, of which the following is the specification.

My invention relates to improvements in taps or faucets, and the object of the invention is to devise a simple, efficient, cheap, durable and readily operated tap or faucet, which will not be liable to get out of order and in which all danger of leakage due to continual use is absolutely avoided or readily provided against.

A further object is to provide a tube in which the vital parts viz. the seat and valve will be removable with a minimum amount of trouble and at a minimum cost.

My invention consists of a tap comprising a main body having a central enlargement and cross boss in front of the same, a depending removable spout screwed into an orifice at the bottom of the body and provided with a seat at the top a ball resting on the seat, a stem extending through the hollow boss and provided with a substantially crank-shaped inner end or blade fitting at the extreme end into a limiting recess in the boss of the body, the parts being otherwise constructed and arranged as hereinafter more particularly explained.

Figure 1, is a perspective view of a tap constructed in accordance with my invention. Fig. 2, is a vertical section through the main portion of the body showing the spout mostly in full. Fig. 3, is a cross section at right angles to the section shown in Fig. 2. Fig. 4, is a detail of an end of the base in section. Fig. 5, is a section similar to Fig. 2, showing a stem handle self-restoring to the normal position.

In the drawings like letters of reference indicate corresponding parts in each figure.

A is the main body of the tap, which has a pipe extension $A'$ leading to the source of supply and having a flange $A^2$ for supporting the tap.

$A^3$ is a cross hollow boss threaded at the one end and provided with an orifice $A^4$ and at the opposite end provided with a sectoral recess $A^5$.

B is a spout, which is provided with a nut-like portion $B'$ and a threaded upper end $B^2$, which is screwed into the internally threaded orifices $A^6$ at the bottom of the body portion.

C is a ball, which may be made of rubber, brass or any suitable material. The ball C rests on a seat $B^3$ at the top of the spout B.

D is the operating stem, which is provided with the usual handle $D'$ and the enlargement $D^2$ and the cranklike blade $D^3$, which extends at the inner end into a sectoral recess $A^5$, which serves to limit the throw of the tap to about a quarter turn or slightly less. The enlargement $D^2$ abuts the threaded end of the hollow boss $A^3$ and may be provided with a washer between it and the hollow boss.

E is a screw cap provided with a nut-shaped periphery at the outer end, which is screwed on to the threaded end of the boss $A^3$ and thereby serves to hold the stem in position.

In Fig. 5 I show a spiral spring 2 located between annular shoulders 3 formed on the stem D. In this form of faucet one end of the spiral spring is connected to the body and the other to the stem, and thereby when the handle is operated as hereinafter described the spring serves to restore the handle to the normal position.

The operation of my faucet is simple and is as follows: The handle $D'$ is pulled down and the blade $D^3$ is thrown into the position shown in dotted lines in Fig. 3, thereby throwing the ball away from its seat and allowing the liquid to pass through the spout B. By throwing the blade into the position shown in full lines in this figure the ball is caused to resume its seat.

From this description it will be seen that I have provided a very simple faucet in which the valve is quickly removed from the path of the water and is not subjected to variable pressure so as to cause it to bound on its seat, but is held in such a position as to be readily and quietly operated both to remove it from its seat and restore it to its seat when the desired amount of water is withdrawn.

What I claim as my invention is:

1. The combination with the body of a faucet having a central enlargement and bottom threaded orifice, of a spout screwed into the orifice and forming a valve seat, a ball resting on the seat, a valve stem having a blade at the inner end of cranklike form, the central enlargement having a boss in which is located a sectoral opening into which the end of the blade extends as and for the purpose specified.

2. The combination with the valve body having a central enlargement and cross hollow boss and the spout depending from the body and having a seat formed at the top, of a ball resting on the seat, a valve stem having a blade off-set and a screw cap for the end of the boss through which the valve stem extends as and for the purpose specified.

3. The combination with the body of a faucet having a central enlargement and bottom threaded orifice, of a spout screwed into the orifice and forming a valve seat, a ball resting on the seat, said faucet having a transverse opening at one side of said enlargement and a recess at the opposite side, a valve stem having a blade at the inner end of cranklike form, said valve stem being mounted in said transverse opening and having its inner end extending into said recess.

WILLIAM ALEXANDER FRASER.

Witnesses:
B. BOYD,
M. EGAN.